April 14, 1925.  1,533,906
W. THREM
COMBINED STORAGE BATTERY AND RECTIFIER
Filed April 12, 1923
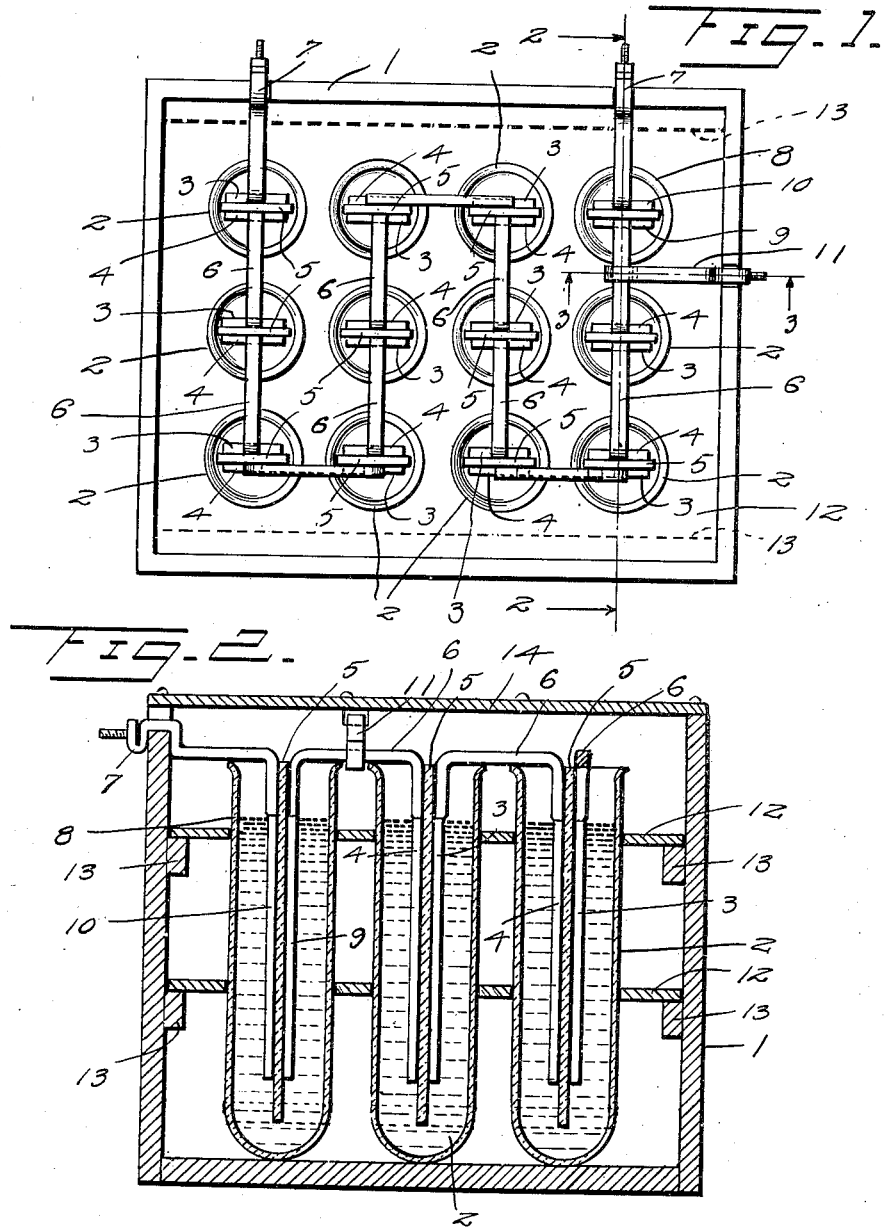
Inventor
W. Threm
By
Attorney Patented Apr. 14, 1925.

1,533,906

UNITED STATES PATENT OFFICE.

WILLIAM THREM, OF CINCINNATI, OHIO.

COMBINED STORAGE BATTERY AND RECTIFIER.

Application filed April 12, 1923. Serial No. 631,582.

*To all whom it may concern:*

Be it known that I, WILLIAM THREM, a citizen of the United States, residing at Cincinnati, in the county of Hamilton and State of Ohio, have invented certain new and useful Improvements in Combined Storage Batteries and Rectifiers; and I do hereby declare the following to be a full, clear, and exact description of the invention, such as will enable others skilled in the art to which it appertains to make and use the same.

The present invention relates to storage batteries and more particularly to a B battery for radio systems and has for its principal object to combine with such battery a rectifier, whereby it is possible to charge the battery by use of an alternating current, said rectifier being coupled in series whereby it may be cut out when charging the battery by a direct current and said rectifier being further arranged to prevent charging of the battery backward which frequently happens.

A further purpose of the invention is the provision of a battery of the type aforesaid comprising a plurality of cells, each cell receiving the electrolyte and a couplet comprising the positive and negative elements and an interposed spacer.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a top plan view of a storage B battery and rectifier embodying the invention, Figure 2 is a section on the line 2—2 of Figure 1, and Figure 3 is a detail view of a movable terminal.

Corresponding and like parts are referred to in the following description and designated in the several views of the drawings by like reference characters.

The numeral 1 designates a case or box which is provided as convenient means for holding the units comprising the battery and rectifier. The case or box 1 embodies means for maintaining the units in determinate spaced relation, and said case or box may be formed of any suitable material.

The battery comprises a plurality of units coupled in series, each unit including a cell 2 and elements such as a positive plate 3, a negative plate 4 and an interposed spacer 5. The battery elements and spacer may be of any well known construction and arrangement commonly provided in the art. A yoke 6 connects the positive element 3 of one unit with the negative element 4 of the next unit and this yoke preferably forms a part of the unit and is utilized as suspending means therefor by resting upon the top of the cells 2 in which the units are received. The elements 3 and 4 are suspended within the cells 2 in a manner to leave a space at the bottom for sediment without endangering the short circuiting of the battery. The terminal elements of the battery are formed with extensions 7 which rest upon the top of the terminal cells 2 and project beyond the case or box 1 for convenience of attachment of the lead wires thereto.

The rectifier included in the battery may comprise one or more cells 8 similar to the cells 2 and elements such as a plate 9 of lead and a plate 10 of aluminum, and in the event of the rectifier comprising more than one unit, the several units will be coupled in series. When charging the battery by means of an alternating current, the rectifier is included in the circuit, but when charging the same by means of a direct current, the rectifier is cut out and this is effected by means of a terminal 11 which is arranged between the last unit of the battery and the rectifier. The terminal 11 may be shifted so as to cut out one or more of the battery units, as may be required, according to the desired voltage for the particular work. The electrolyte for the battery cells 2 may consist of a solution of sulphuric acid of any required strength, and the electrolyte for the rectifier cells 8 may consist of a saturated solution of borax, phosphate sodium, or other chemical generally employed for this purpose. If preferred, the cells may be closed in any manner to prevent evaporation of the electrolyte, or paraffin oil may be floated on the top of the electrolyte for the same purpose.

The cells of the units may be of any capacity and constructed of any preferred material and, in practice, consist of test tubes which are relatively small and adequately adapted for the purpose. The construction is such that any unit may be readily cut out of circuit to admit of replacement and the voltage of the battery may be varied by shifting the terminal 11, the latter also providing for cutting the rectifier out of circuit when not required for use. Said terminal 11 has hooks 11ª and 11ᵇ opening in planes substantially at a right angle to each other and respectively engageable with yokes 6 and the case 1.

As shown, the case or box 1 is provided with a plurality of partitions 12 at different levels and supported upon cleats or straps 13 attached to the inner faces of the enclosing sides. These partitions are provided with openings in which the cells 2 are fitted. A cover 14 closes the top of the box and may be secured thereto in any preferred way.

What is claimed is:

1. A storage battery including a plurality of cells electrically connected in series, a rectifier cell electrically connected to one end of said series, a terminal secured to said rectifier, another terminal secured to the end cell of the series farthest removed from the rectifier, and a third terminal adapted to be connected in circuit with the series of battery cells at different positions for charging and discharging the battery.

2. A storage battery having a plurality of cells, conductor means connecting the electric parts of the battery, terminals for said conductor means, one of said terminals having hooks opening in planes substantially at a right angle to each other, a case for the cells, one of said hooks engaging the case, the other hook engaging said conductor means, and said hooks permitting detachment and application of the second mentioned terminal to the conductor means at different locations to vary the output voltage of the battery.

In testimony whereof I affix my signature in presence of two witnesses.

WILLIAM THREM.

Witnesses:
A. N. HUBNER,
E. G. BERNHART.